Jan. 14, 1969
J. G. CADIOU
3,421,606
LOAD-RESPONSIVE HYDRAULIC SHOCK ABSORBERS
Filed Dec. 9, 1966
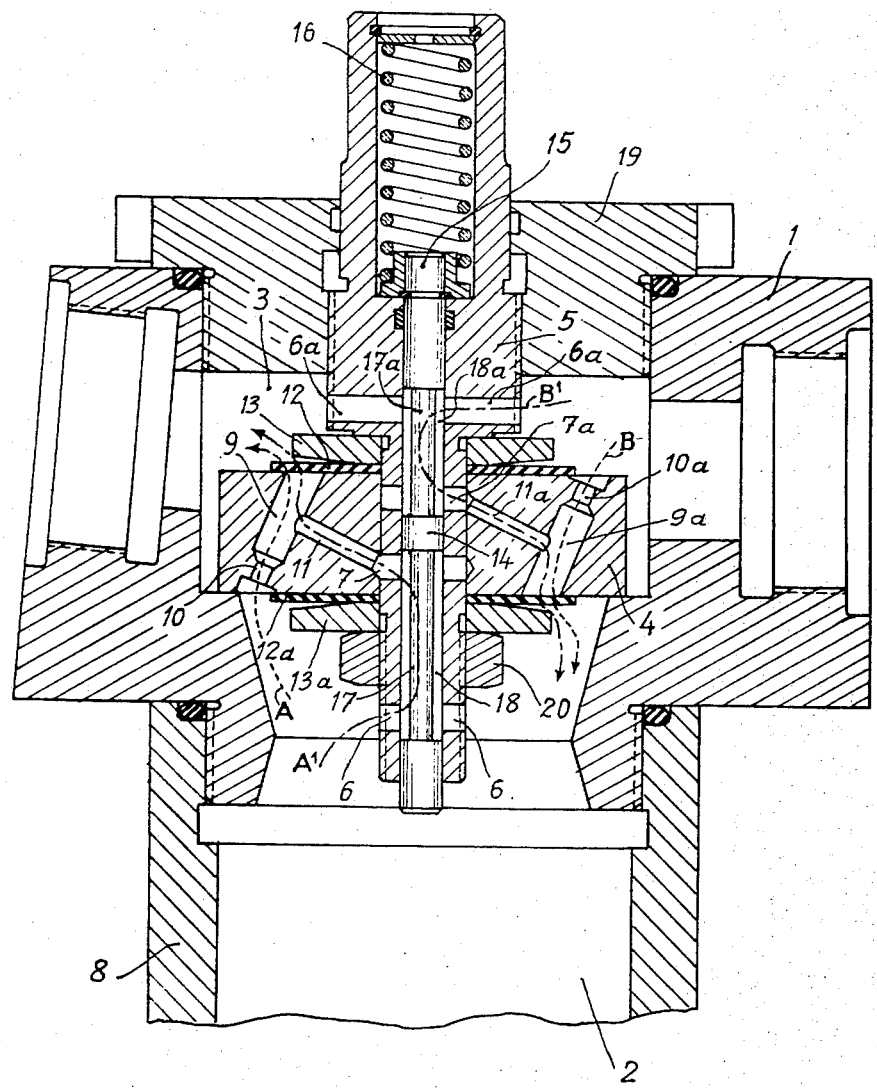
Jean Georges Cadiou,
Inventor
By Wenderoth, Lind and Ponack,
Attorneys United States Patent Office 3,421,606
Patented Jan. 14, 1969

3,421,606
LOAD-RESPONSIVE HYDRAULIC SHOCK ABSORBERS
Jean Georges Cadiou, Paris, France, assignor to Societe Anonyme Andre Citroen, Paris, France, a corporation of France
Filed Dec. 9, 1966, Ser. No. 600,511
Claims priority, application France, Dec. 14, 1965, 42,161
U.S. Cl. 188—100    4 Claims
Int. Cl. F16d 57/00; F16k 17/26; F16k 45/00

This invention relates in general to hydraulic shock absorbers of suspenson systems for automobiles and other vehicles, and has specific reference to improvement in shock absorbers of this character with a view to impart load-responsive characteristics thereto.

In most instances shock absorbers of the suspension systems have characteristics varying only very moderately with the vehicle load, and hitherto known devices of this type are scarcely suited for adapting the damping action of a suspension system to the momentary load thereof.

It is the essential object of the present invention to avoid this inconvenience.

To this end, the present invention provides a hydraulic shock absorber designed for automotive or other vehicles equipped with a hydraulic suspension system; this improved shock absorber, of the type comprising a hollow body filled with liquid, a partition separating said hollow body into two compartments of which one is of the variable-capacity type, and valve means controlling the flow, through suitable ducts, of said liquid from one compartment to the other compartment, being characterised in that the aforesaid partition comprises in a bore an auxiliary jet consisting of a slide valve associated with elatsic return means, said slide valve receiving at one end the liquid of the suspension system and having its opposite end responsive to a constant pressure, said slide valve being adapted, in predetermined positions, to open or to close at least one auxiliary communication passage between said two compartments, said passage being controlled by said valve means.

When this communication passage is open, if the pressure prevailing in the suspension system is low and the vehicle moderately loaded, the damping action produced by the device of this invention is relatively smooth and becomes very strong when the vehicle is heavily loaded, in which case the communication passage is closed.

However, this invention will be better understood as the following description proceeds with reference to the single figure of the attached drawing illustrating diagrammatically in axial section a typical form of embodiment of a load-responsive hydraulic shock absorber constructed according to the teachings of this invention.

Referring to the drawing, the shock absorber comprises a hollow body 1 filled with liquid and disposed preferably vertically; the inner space of this body is divided into two compartments 2 and 3 by means of a central partition 4 receiving in a central bore a cylinder 5 in which lateral ports 6, 6a and 7, 7a are formed, as shown. A member 8 secured to the body 1 enables the lower compartment 2 to receive a liquid contained in a hydraulic suspension system not shown in the figure in order not to make it unduly complicated. Ducts 9 and 9a are formed through the partition 4 and provided with gauged orifices 10 and 10a at their inlet end, and transverse ducts 11 and 11a connect the ducts 9 and 9a to the central bore of cylinder 5, respectively, by means of the lateral ports 7 and 7a of cylinder 5.

The upper and lower faces of partition 4, and more particularly the outlet ports of ducts 9 and 9a, are engaged by valve members 12 and 12a respectively, which consist for example of elastic disks, as shown in the drawing, having their stroke limited by means of washers 13 and 13a associated therewith and adapted to prevent the filling liquid from flowing from compartment 3 to compartment 2 and vice versa.

Slidably mounted in the bore of cylinder 5 is a slide valve 14 emerging with its upper end in the free atmosphere and urged downwardly by resilient means 16, for example a prestressed coil compression spring. This slide valve comprises two sections of reduced diameter 17 and 17a constituting in the cylinder 5 annular spaces 18 and 18a adapted to prevent or permit, according to the axial position of the slide valve, the communication between the compartments 2 and 3 via ports 6 and 6a, spaces 18 and 18a, ports 7 and 7a, and ducts 11 and 11a, 9 and 9a, in the direction shown by the arrows $A^1$ and $B^1$; if desired, the communication in the direction of the arrow $B^1$ may be suppressed together with the passages 6a, 18a, 7a and 11a. On the other hand, the flow of filling fluid from compartment 2 to compartment 3 or vice versa is still possible irrespective of the slide valve position through the ducts 9 and 9a, and gauged orifices 10 and 10a, in the directions shown by the arrows A and B.

It may be noted that as shown in the drawing it is possible to secure the cylinder 5 to a cover 19 rigid with the body of the shock absorber according to this invention, the partition 4, valve members 12 and 12a, washers 13 and 13a, being mounted on the cylinder 5 and tightly clamped by means of a nut 20.

The above-described shock absorber operates as follows:

If the vehicle load is relatively moderate, the low pressure of the fluid in the suspension system which is exerted against the lower face of the slide valve cannot lift this slide valve and overcome the resistance of the prestressed spring 16. The fluid filling the shock absorber flows in the direction of the arrows A or B according as the pressure increases or decreases in the suspension system, member 8 and compartment 2, another circuit being open in parallel in the direction of the arrows $A^1$ and $B^1$. Under these conditions the damping action is relatively smooth.

If, in contrast thereto, the vehicle load is relatively heavy, the pressure of the suspension liquid becomes sufficient to lift the slide valve, thus closing partially or completely the ports 6 and 7a. Thus, the circuits $A^1$ and $B^1$ permit the passage of zero or little amount of liquid and the damping action exerted by the device of this invention is considerably stronger, thus adapting itself to the load of the vehicle.

Of course, the specific form of embodiment described hereinabove, and illustrated in the attached drawing should not be construed as limiting the invention since many modifications and variations may be brought thereto as anybody conversant with the art will readily understand, without inasmuch departing from the spirit and scope of the invention as set forth in the appended claims.

I claim:

1. Hydraulic shock absorber for automotive or other vehicles equipped with a hydraulic suspension system, this shock absorber being of the type comprising a hollow body filled with liquid, a partition separating said hollow body into two compartments of which one is of the variable volume type, and valve means controlling the flow, through suitable ducts of the aforesaid liquid from one compartment to another, this shock absorber being further characterised in that said partition comprises in a bore an auxiliary jet consisting of a slide valve responsive to elastic return means and having one end responsive to the suspension liquid pressure and the other end responsive to a constant pressure, said slide valve being adapted, in predetermined positions, to open or close at least one auxiliary communication passage between said two compartments, said passage being controlled by said valve means.

2. Shock absorber according to claim 1, characterised in that said partition comprises ducts of a first group for the passage of liquid in one direction and ducts of another group for the passage of liquid in the opposite direction, the ducts of said one and other groups being provided at their inlet ends with gauged orifices and at their outlet ends with valve means consisting each of an elastic disk, whereby, according to its position, said slide valve will either prevent or permit the flow of liquid through said auxiliary ducts of one or the other of said two groups.

3. Shock absorber according to claim 1, characterised in that said slide valve bore communicates adjacent its ends with one and the other compartments respectively.

4. Shock absorber according to claim 1, characterised in that the slide-valve bore is formed in a cylinder carrying said partion and valve means, and secured to the body of the shock absorber.

References Cited

UNITED STATES PATENTS

| | | | |
|---|---|---|---|
| 2,184,190 | 12/1939 | Krauss | 137—493 XR |
| 2,286,291 | 6/1942 | Magrum | 137—493 XR |
| 2,699,844 | 1/1955 | McIntyre | 137—493 XR |
| 3,113,644 | 12/1963 | Wossner | 137—493 XR |

M. CARY NELSON, *Primary Examiner.*

ROBERT J. MILLER, *Assistant Examiner.*

U.S. Cl. X.R.

137—493